Patented Oct. 20, 1925.

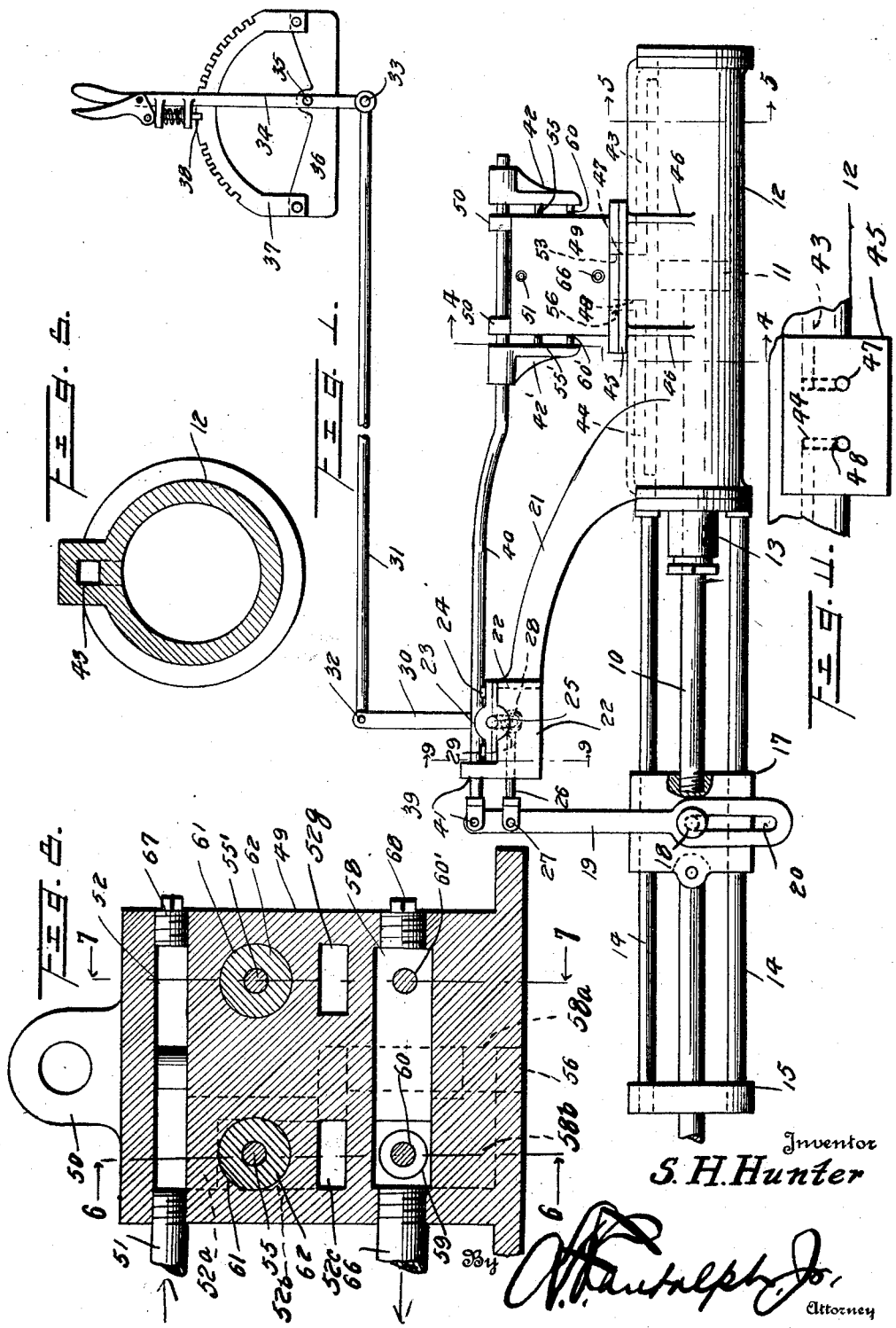

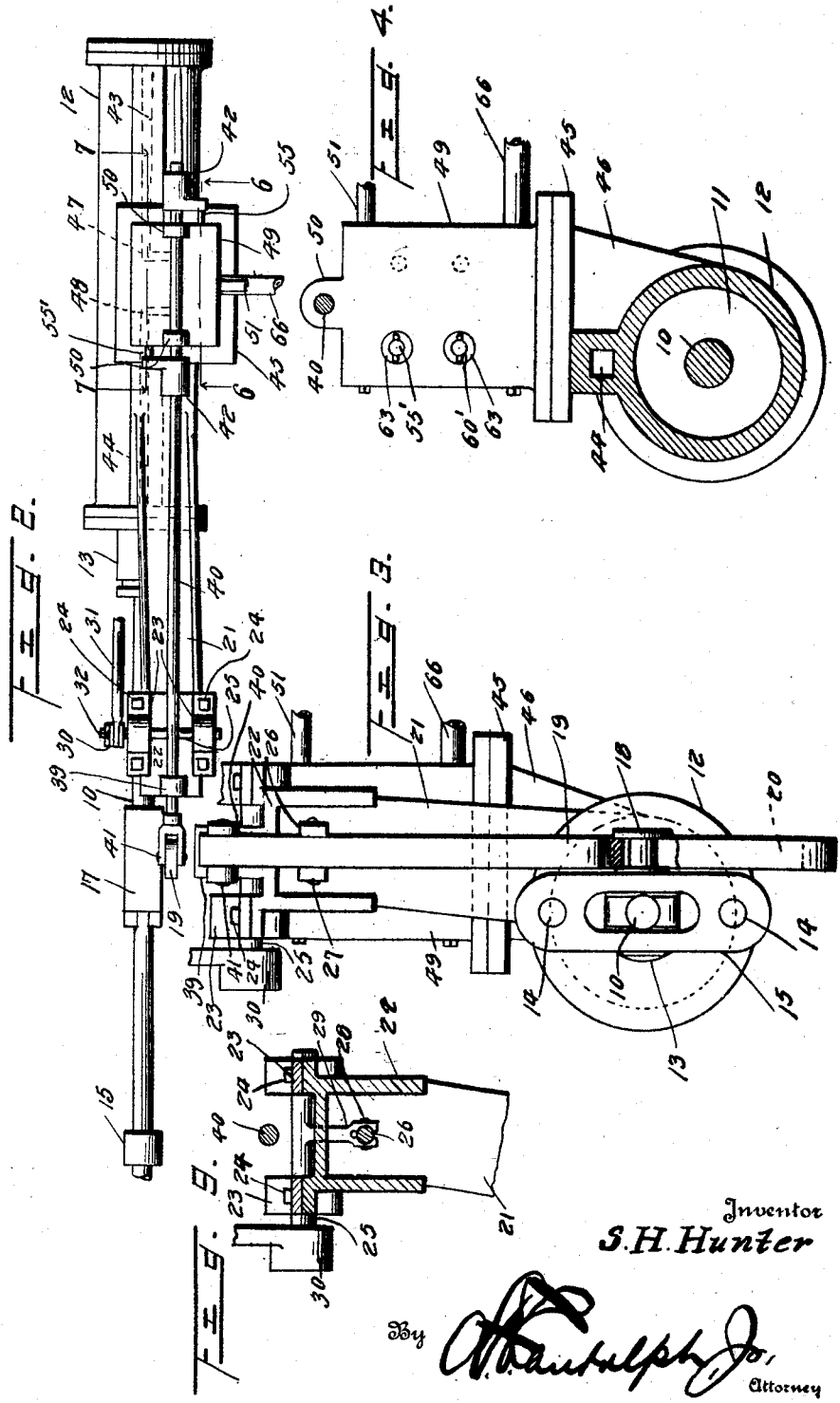

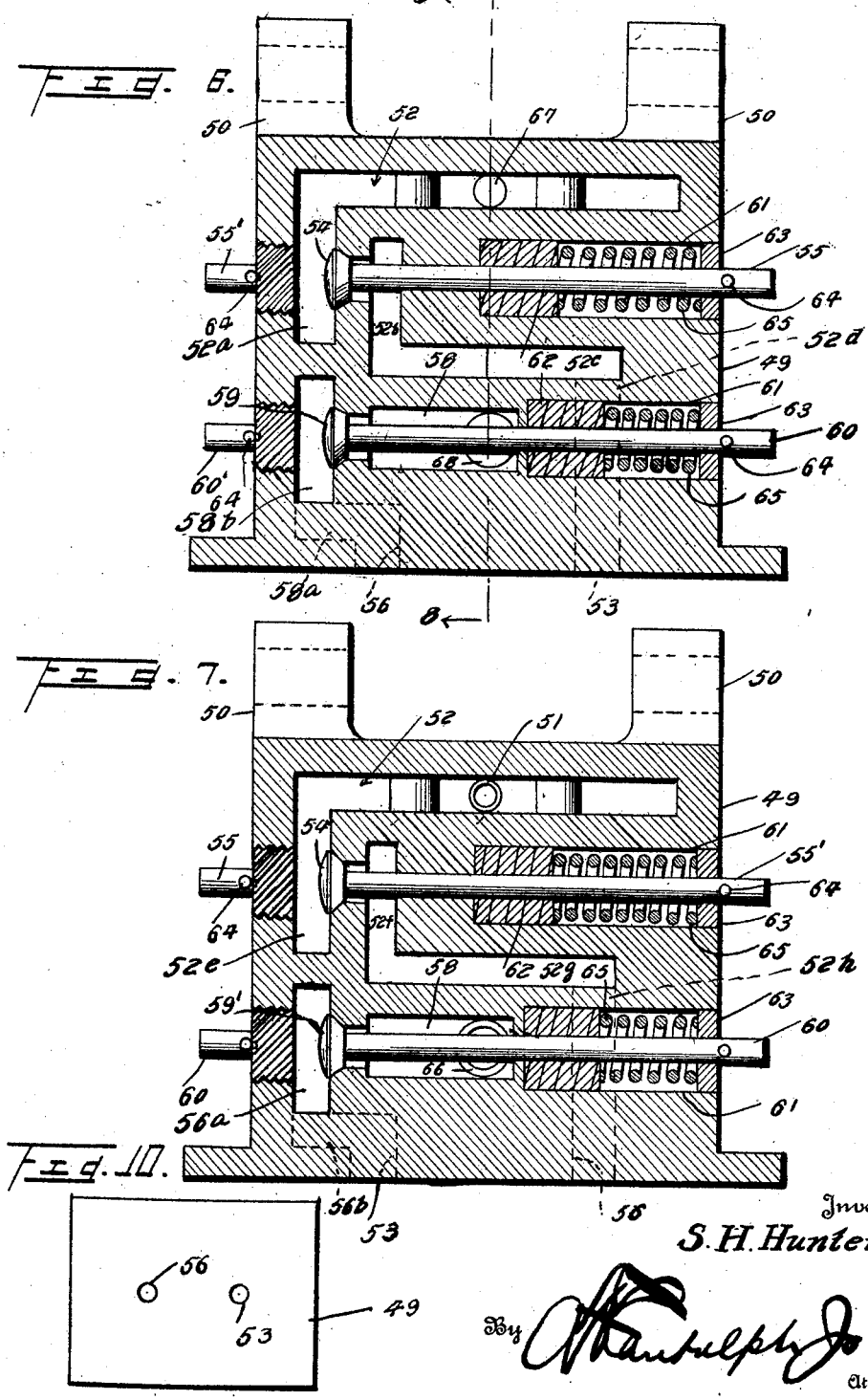

1,558,363

UNITED STATES PATENT OFFICE.

SMITH H. HUNTER, OF BUNTYN, TENNESSEE.

REVERSING GEAR FOR LOCOMOTIVE ENGINES.

Application filed December 1, 1921. Serial No. 519,242.

*To all whom it may concern:*

Be it known that I, SMITH H. HUNTER, a citizen of the United States, residing at Buntyn, in the county of Shelby and State of Tennessee, have invented certain new and useful Improvements in Reversing Gears for Locomotive Engines; and I do hereby declare the following to be a full, clear, and exact description of the invention, such as will enable others skilled in the art to which it appertains to make and use the same.

This invention relates to an automatic fluid-pressure operated reversing gear for locomotive engines.

One object is to improve and render more efficient the power actuated valve gear operated mechanism disclosed in Letters Patent No. 1,206,707 issued to me on November 28, 1916.

A prime object is to provide a novel and efficient valve structure to control the admission of the fluid possessing the advantages and structural equivalent of that herein described and set forth in the accompanying drawings.

Specific and definite objects and advantages will appear as said description progresses.

In said drawings:—

Figure 1 is a side elevation of my improvement;

Figure 2 is a top or plan view thereof;

Figure 3 is a fragmentary end view.

Figure 4 is a cross sectional view on the line 4—4 of Figure 1;

Figure 5 is a cross sectional view on the 5—5 of Figure 1;

Figure 6 is a longitudinal sectional view on the line 6—6 of Figures 2 and 8.

Figure 7 is a longitudinal sectional view on the line 7—7 of Figures 2 and 8.

Figure 8 is a cross sectional view on the line 8—8 of Figure 6 through the complete valve casing.

Figure 9 is a cross sectional view on the line 9—9 of Figure 1.

Figure 10 is a bottom view of the valve casing on a reduced scale.

Figure 11 is a fragmentary plan view of the power cylinder illustrating the parts thereof.

Referring specifically to the drawings, wherein like reference characters designate like or corresponding parts, 10 designates a rod slidable in opposite directions to control the position of the reverse gear or mechanism (not shown) of a locomotive engine. A piston is provided on the rod 10 at 11 and operates in a cylinder 12. At 13, a packing box for the rod 10 is provided on the cylinder. Extending from the cylinder and parallel with the rod 10 and on opposite sides thereof are rods 14 which are connected together at their free ends by means of a head 15, having an enlarged opening therein through which rod 10 slides. Slidable along the rods 14 is the usual cross head 17 having connection with the rod 10 and a stud 18 projects laterally therefrom. A link or arm 19 is provided having an elongated slot 20 through which said stud 18 projects.

An arm 21, which may be integral with the cylinder 12, and preferably U-shaped in cross section, is provided. The outer end of the arm 21 is formed into a bearing block at 22 and plates 23 are bolted at 24 against its top wall, so as to cooperate therewith to form a bearing for a transverse pivot rod or shaft 25. A link 26 is pivoted at 27 to the arm 19, and extends into the block 22 and therein is pivoted at 28 to a short crank arm 29 on the pivot rod or shaft 25. Exteriorly of the housing, a crank arm 30 is rigidly connected to rod 25 and this crank arm is adapted to be rocked in any suitable way. As shown, a link 31 is pivoted thereto at 32 and at 33 to a lever 34 pivoted at 35 to a bracket 36 mounting a quadrant or toothed sector 37 with the teeth of which, a conventional locking or plunger mechanism 38 of the lever, is associated.

A bearing lug 39 rises from and is preferably integral with the block 22. A valve shifting rod 40 is slidable through the lug 39 and pivoted to the link 19 at 41. Spaced arms or lugs 42 and 42' extend rigidly from the rod 40.

Passageways 43 and 44 are provided in the cylinder 12 for the inlet and exhaust of a fluid pressure medium to shift the piston and accordingly rod 10, in either direction.

A table 45 is preferably cast integral with the cylinder 12 and has reinforcing webs, integral with the same and with the cylinder, as at 46. Ports 47 and 48 are provided through the table 45 and they communicate with the passageways 43 and 44, as shown in Figures 1 and 11.

Upon the table 45, a valve casing 49 is provided which may have lugs 50 rising therefrom in which the rod 40 is slidably mounted.

Any suitable fluid pressure means may be utilized but I have shown the device as equipped to utilize selectively, two means, preferably steam and air. To this end, one of said means may be supplied to an inlet manifold chamber 52 in the casing 49 through an inlet pipe 51. Communication between the inlet manifold chamber 52 and port 47 is established by a series of passages $52^a$, $52^b$, $52^c$, $52^d$, and 53, the passage 53 communicating with the port 47. Communication between the port 48 and the inlet manifold chamber 52 is established by a series of passages $52^e$, $52^f$, $52^g$, $52^h$, and 56, the passage 56 communicating with the port 48. Communication between the inlet manifold chamber 52 and the port 47 is normally cut off by means of a valve 54, the stem 55 of which projects beyond one end of the valve casing 49. An exhaust passageway for port 48 is provided by establishing communication between passage 56 and an exhaust manifold chamber 58 by means of passages $58^a$ and $58^b$. Communication between the passage 56 and exhaust manifold chamber 58 is normally closed by a valve 59 having a stem or rod 60 projecting beyond the casing at that end beyond which projects the stem or rod 55.

An inlet valve 54' having a stem 55' normally closes communication between the inlet manifold 52 and the passage 56. An exhaust passageway for port 47 is provided by means of passageways 56 and $56^b$ communicating with passage 53, a valve 59' controlling communication between passageway $56^a$ and exhaust manifold 58. Valves 54' and 59' will project beyond one end of the casing and are disposed opposite to valves 54 and 59, that is, with their stems 55' and 60' projecting beyond the opposite ends of the casing 49, as shown in Figures 1, 6 and 7. As will also be noted in Figure 1, where the parts are in neutral position, lug 42 is in engagement with the stems 55 and 60 at one end of the casing 49 and the lug 42' is in engagement with the stems 55' and 60' at the other end of the casing.

The fluid may exhaust from the same side of the casing that pipe 51 is disposed on, as through a pipe 66. At the opposite side of the casing, plugs 67 and 68 may respectively close openings in manifolds 52 and 58 which are removable to replace pipes 51 and 66 and so that a supply pipe and an exhaust pipe for another selected power medium may be connected in the openings exposed by removal of the plugs 67 and 68.

In operation, to place the reversing gear of the locomotive engine in one position, lever 34 is moved to the right, which through the medium of the link 31, crank 30, shaft 25, crank 29, link 26, lever 19, and rod 40, lug 42' shown in Figure 1 will move the valve stems 55' and 60' to the right, thus moving valves 54' and 59' from their seats. With pipe 51 in communication with the source of fluid supply, the fluid will enter the manifold 52, pass valve 54', and pass through passages $52^f$, $52^g$, $52^h$, and 56 and enter the cylinder 12 through port 48 and passageway 44 moving the piston 11 to the right. Simultaneously the compression in the rear of the piston will be relieved through passageway 43, port 47, passages 53, $56^b$ and $56^a$, past valve 59', into manifold 58 and out through pipe 66 When the engine is to be reversed from said position, the lever 34 is moved to the left in Figure 1 which will operate the parts reverse to that stated so that the lug 42 will press the adjacent valve stems 55 and 60 inwardly so that fluid from pipe 51 will enter the casing and from inlet manifold chamber 52 pass through the passages $52^a$, $52^b$, $52^c$, $52^d$, and 53 into the cylinder through port 47 and passageway 43, moving the piston 11 to the left and accordingly the valve gear to which it is connected. The pressure behind the piston in this instance, will be relieved through the passageway 44, port 48, passages 56, $58^a$ and $58^b$, past valve 59, into manifold 58, and out through pipe 66.

What is claimed is:—

1. A reverse mechanism including a cylinder, a piston operable therein associated with reversing gear, an upstanding link cooperating with said piston and gear, valve means to control the admission and exhaust of motive fluid into and from the cylinder having a casing, an arm extending beyond and above one end of the cylinder, said arm having a bearing block, plates secured to said bearing block, a shaft journaled intermediate said bearing block and plates, a crank on said shaft, a link extending from the crank to the first mentioned link, a rod extending from the first mentioned link above the shaft and second mentioned link and slidably mounted on said casing, means on the rod to operate the valve means, a crank arm extending from said shaft, and means to operate the crank arm.

2. A reverse mechanism including a cylinder, a reverse gear operating piston operable in said cylinder, an upstanding link cooperating with said piston and gear beyond one end of the cylinder, valve means to control the admission and exhaust of motive fluid to and from the cylinder having a casing extending above the cylinder, an arm extending integrally from the cylinder beyond and above one end thereof, a shaft journaled on said arm adjacent its free end, a crank on said shaft, a link extending from the crank to the first mentioned link, a rod extending from the first mentioned link above the shaft and second mentioned link, means on said rod to operate the valve means, and means to rock said shaft.

In testimony whereof I affix my signature.

SMITH H. HUNTER.